(12) United States Patent
Dragone et al.

(10) Patent No.: US 6,263,127 B1
(45) Date of Patent: Jul. 17, 2001

(54) FREE-SPACE/ARRAYED-WAVEGUIDE ROUTER

(75) Inventors: Corrado Pietro Dragone, Little Silver Township, Monmouth County; Joseph Earl Ford, Oakhurst Township, Monmouth County, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/311,544

(22) Filed: May 13, 1999

(51) Int. Cl.[7] ....................................................... G02B 6/28
(52) U.S. Cl. .................. 385/24; 385/33; 385/37; 385/46
(58) Field of Search .................................. 385/24, 15, 37, 385/16, 17, 27, 33, 36, 46, 14, 11, 34

(56) References Cited

U.S. PATENT DOCUMENTS 6,144,783  * 11/2000  Epworth et al. .................. 385/24

* cited by examiner

Primary Examiner—Phan T. H. Palmer
(74) Attorney, Agent, or Firm—John A. Caccuro (57) ABSTRACT

A router combines free-space and guided wave optics to drastically increase the number of channels used in WDM transmission systems. The two-stage router uses the partial demultiplexing characteristic of an arrayed waveguide router (AWR) combined with a free-space optical router to fully demultiplex an input WDM signal. The two-stage router can be used to obtain output wavelength signals in either one- or two-dimensional arrays.

14 Claims, 6 Drawing Sheets

FREE-SPACE/ARRAYED-WAVEGUIDE ROUTER

TECHNICAL FIELD OF THE INVENTION

This invention relates to multiwave optical routers for use in wavelength division multiplexed (WDM) systems and, more particularly, to a router combining free-space and guided wave optics to increase the number of wavelength channels that can be handled by such routers.

BACKGROUND OF THE INVENTION

Wavelength division multiplexed (WDM) transmission systems currently use integrated optical arrayed waveguide routers (AWRs) to multiplex individual wavelength signals onto a single fiber and to demultiplex the signals received over a fiber. However, as the number of channels used in WDM transmission systems increases, suitable AWRs become increasingly difficult to design and fabricate. Some of the difficulties involved are forming flat passbands, and suppressing the interchannel crosstalk from the many output lines. Using today's technology, it should be possible to manufacture an 128 channel router with a 50 GHz spacing, but further increases to the channel count will probably require a new approach.

What is desired is a technique for increasing the number of channels that can be used in WDM transmission systems.

SUMMARY OF THE INVENTION

In accordance with the method and apparatus of the present invention, we describe a router combining free-space and guided wave optics to increase the number of channels used in WDM transmission systems by a factor of five or more. We have recognized that the partial demultiplexing characteristic of an arrayed waveguide router (AWR) can, advantageously, be combined with a free-space optical router to fully demultiplex an input WDM signal. The two-stage router can be used to obtain output wavelength signals in either one- or two- dimensional arrays.

More particularly, in accordance with our invention, an optical apparatus comprises an optical arrayed waveguide router (AWR) for receiving at an vinput wavelength division multiplexed (WDM) signal having M wavelength channels, M>1, and a one dimensional array of N outputs, 1<N<M, for outputting the WDM signals from the AWR, each output n, where 1≦n≦N, including a partially demultiplexed signal having a plurality of wavelength channels n, n+N, n+2N, . . . n+{M/N−1}N of the WDM signal. A free-space optical wavelength channel demultiplexer receives each of the partially demultiplexed signal channels and produces therefrom M wavelength channels, each of the M wavelength channels being outputted at a different one of M outputs.

According to other aspects of our invention, the free-space optical wavelength channel demultiplexer may be implemented using a combination of one or more lenses and a transmissive or a reflective grating. Other features of our invention enable the M outputs to terminate in a one-dimensional array of fibers or a two-dimensional array of fibers or mirror elements. According to another aspect, each-mirror element of an array of mirror elements is independently controlled to reflect its associated wavelength back through the apparatus to a originating AWR or to a second AWG to implement switching or other control of the demultiplexed wavelength signals.

BRIEF DESCRIPTION OF THE DRAWINGS

In the drawings.

In the following description, identical element designations in different figures represent identical elements. Additionally in the element designations, the first digit refers to the figure in which that element is first located (e.g., 102 is located in FIG. 1).

DETAILED DESCRIPTION

Figure 1:
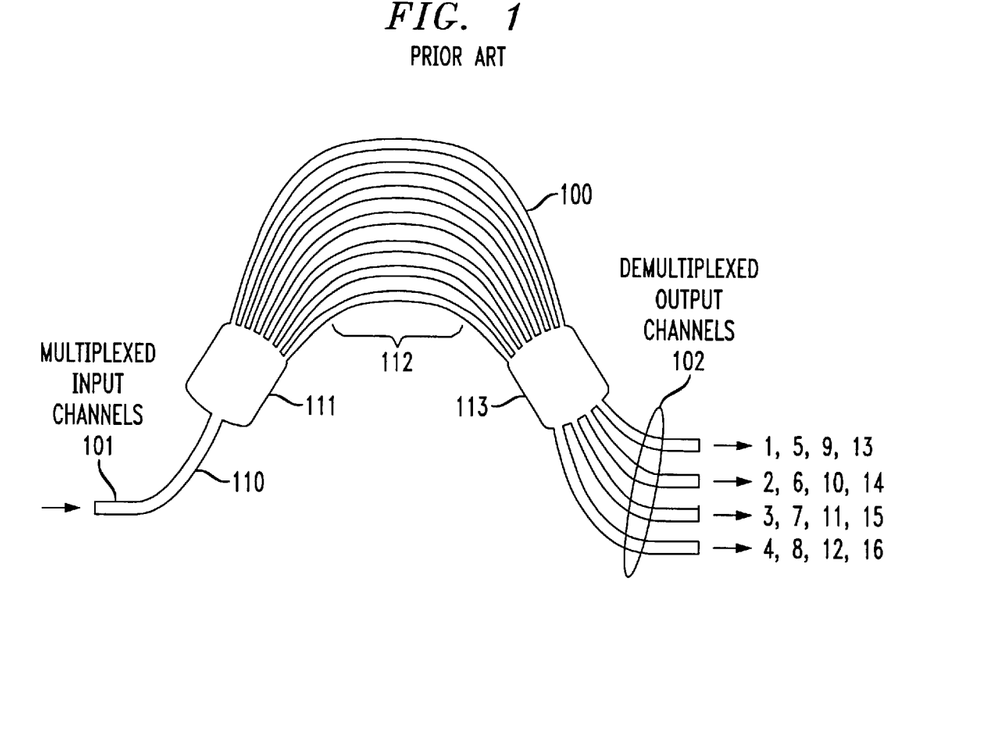
FIG. 1 shows an illustrative block diagram of a prior art four channel arrayed waveguide router(AWR)

With reference to FIG. 1 there is shown an illustrative diagram of a prior art four channel arrayed waveguide router(AWR). Such an AWG is described in U.S. Pat. No. 5,136,671 issued to C. Dragone on Aug. 4, 1992. The AWG is shown to include an input waveguide 110, a first free space region 111, a set of chirped waveguides 112, a second first free space region 113, and a set of output waveguides 102. Initially, we assume that the input WDM signal includes four wavelengths 1–4. As shown, the AWR device 100 separates the four wavelengths 1–4 of WDM input signal 101, which are contained within the device's free spectral range (FSR), onto four separate outputs 102. Normally, an AWR is used with a range of wavelengths restricted to lie within the FSR. We now assume that the AWG receives a WDM signal included 16 wavelengths, the additional wavelengths being outside of the FSR. In this scenario, since the WDM signal included 16 wavelengths, the additional wavelengths outside of the FSR are also routed to one of the outputs due to the "wraparound" property of waveguide routers, as shown in FIG. 2.

Figure 2:
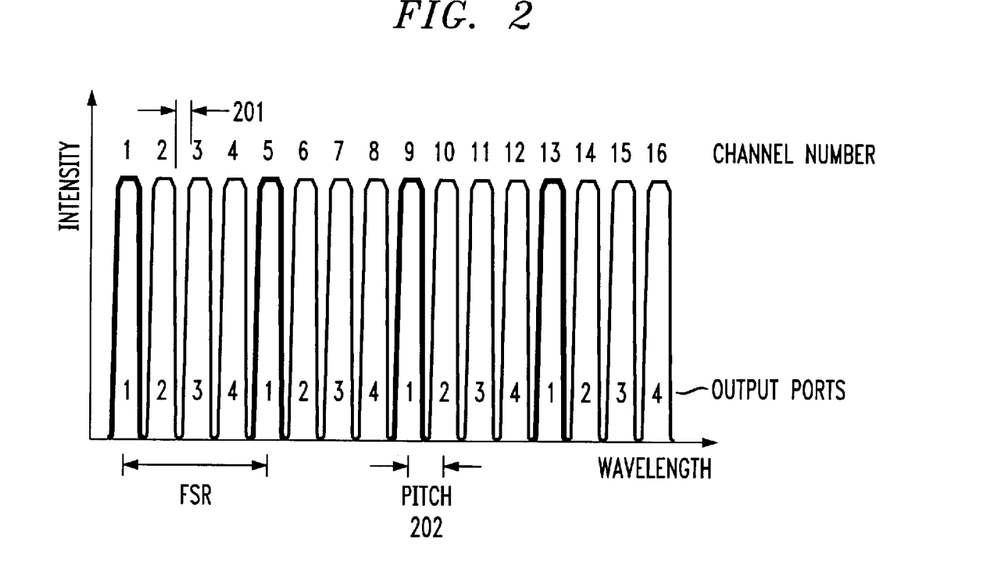
FIG. 2 shows an illustrative graph of the signal intensity transmission through the AWR of FIG. 1.

With reference to FIG. 2 there is shown an illustrative graph of the signal intensity transmission level of the 16 wavelengths and how they are cyclically distributed (i.e., how they wraparound) to the four output channels 102 of the AWR of FIG. 1. As shown, with a broad spectrum WDM input signal including 16 wavelength channels, spanning a wavelength range four times the FSR, each of the 4 output ports would output 4 wavelengths separated by (approximately) one FSR. When used in this manner, the AWG only partially demultiplexes the 16 wavelength input WDM signal into four outputs. Thus as shown in FIG. 2, output port 1 includes wavelengths 1, 5, 9, and 13; output port 2 includes wavelengths 2, 6, 10, and 14 and so on. More generally, receiving an input wavelength division multiplexed (WDM) signal having M wavelength channels, M>1, and a one dimensional array of N outputs 102, where 1<N<M, each output n, where $1 \leq n \leq N$, would include channels n, n+N, n+2N, . . . n+{M/N−1}N of the WDM signal.

The four superimposed wavelengths of each output port of the AWR of FIG. 1 could of course, be further separated into individual wavelengths using another AWR for each port. Such an arrangement is disclosed in the U. S. patent application Ser. No. 08/831,875 now abandoned entitled "Composite optical router with hierarchical routing levels and increased port capacity" filed on Apr. 2, 1997 by M. Nuss, J. Stark, and J. A. Walker, which is incorporated by reference herein. We have recognized that this partial demultiplexing characteristic of the AWR can, advantageously, be combined with a free-space optical router to fully demultiplex the input WDM signal. In accordance with the present invention, our new two-stage optical router combines a guided wave optics stage with freespace stage in a manner which may increases the number of channels effectively handled by a factor of five or more.

Figure 3:
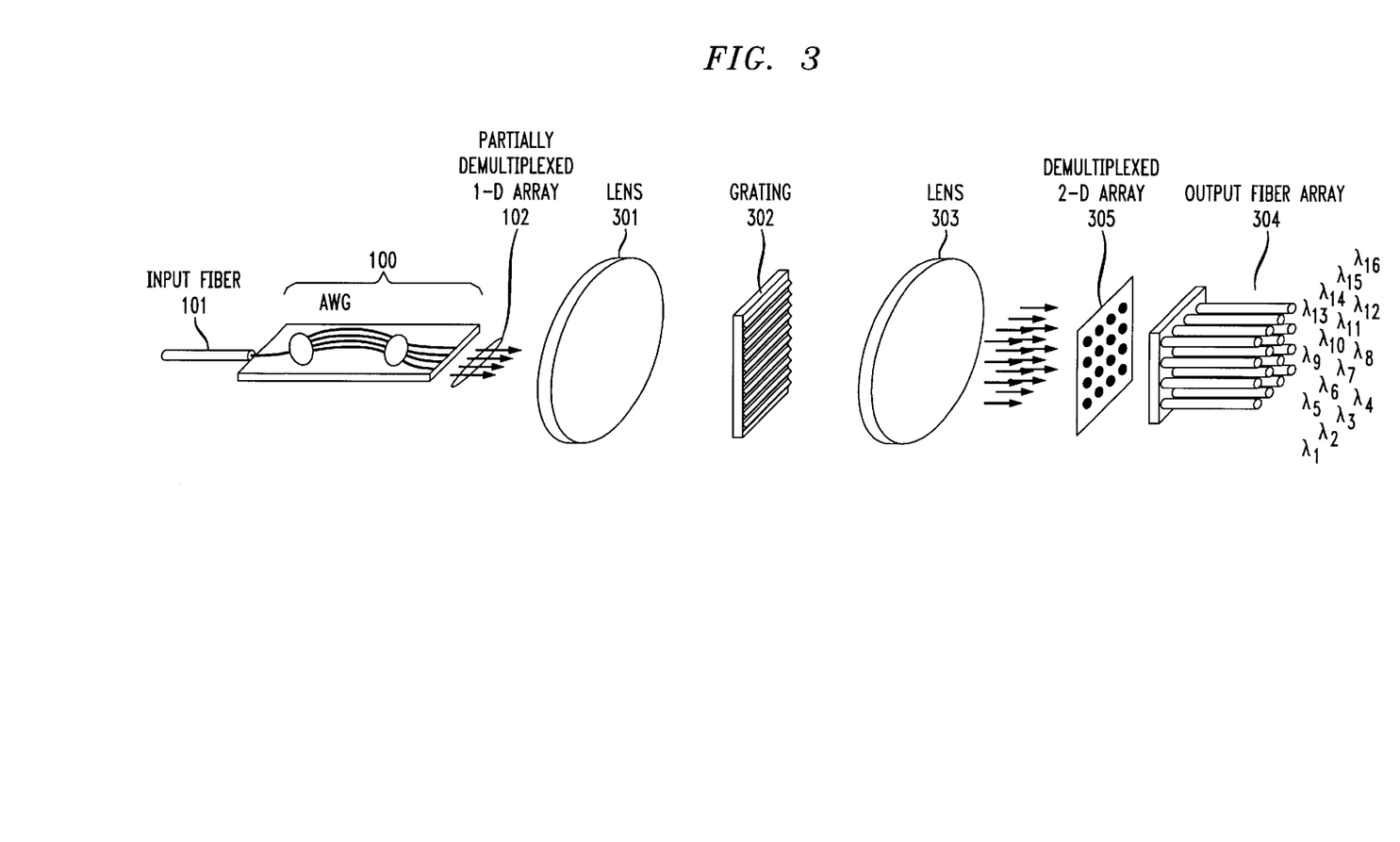
FIG. 3 shows, illustratively in accordance with the present invention, a diagram of a combination guided wave/free-space wavelength router with a two-dimensional output array.

As shown in FIG. 3, in one embodiment, we use free-space optical wavelength demultiplexing by imaging all of the partial demultiplexed output port signal of the AWG through a planar diffraction grating onto the final demultiplexed output plane, creating a two-dimensional (2-D) array spots with the fully demultiplexed wavelengths. As shown, a 16 wavelength WDM input signal is received at input 101 of AWR 100 (FIG. 1), the partially demultiplexed one-dimensional signal array 102 from the 4 outputs 102 is collimated in lens 301. The resulting collimated one-dimensional signal array 102 is directed to a transmissive planar diffraction grating 302 which demultiplexes each of the partially demultiplexed signal of the one-dimensional signal array 102 into its individual wavelengths. The result is a two-dimensional array of demultiplexed wavelength signals $\lambda 1$–$\lambda 16$ which are then focused by lens 303 onto an output fiber array 304. The focused optical spot spacing or layout pattern of the two-dimensional array of wavelength signals $\lambda 1$–16 is shown at plane 305.

The particular spot layout pattern 305 depends on the orientation and spatial frequency of the grating 302. As shown in FIG. 3, grating 302 forms a rectangular array of raster-scanned wavelength spots using a grating where the grating lines are substantially parallel to the row of partially demultiplexed waveguide outputs.

As shown, the separated wavelengths $\lambda 1$–16 are directed into individual fibers of two-dimensional fiber array 304 placed at the wavelength-demultiplexed focus plane 305 so that each wavelength couples into one of the output fibers. While a two-dimensional fiber array 304 is difficult to fabricate and align with the necessary accuracy for single mode fiber coupling, such an array can be manufactured using, for example, fibers assembled into a stack of silicon substrates with V-groove alignment features etched into their surface. Such 2-D arrays are well known in the literature, and have been used to make array connectors for single- and multi-mode fiber. See, for example, the book entitled "Optoelectronic Packaging" edited by A. R. Mickelson, N. R. Basavanhally, and Y. C. Lee, John Wiley & Sons, 1997, Chapter 9, Section 4. As a matter of alignment convenience, compactness, simplicity and robustness it may be preferable to use a reflective diffraction grating rather than the transmissive grating 302 shown in FIG. 3.

Figure 4:
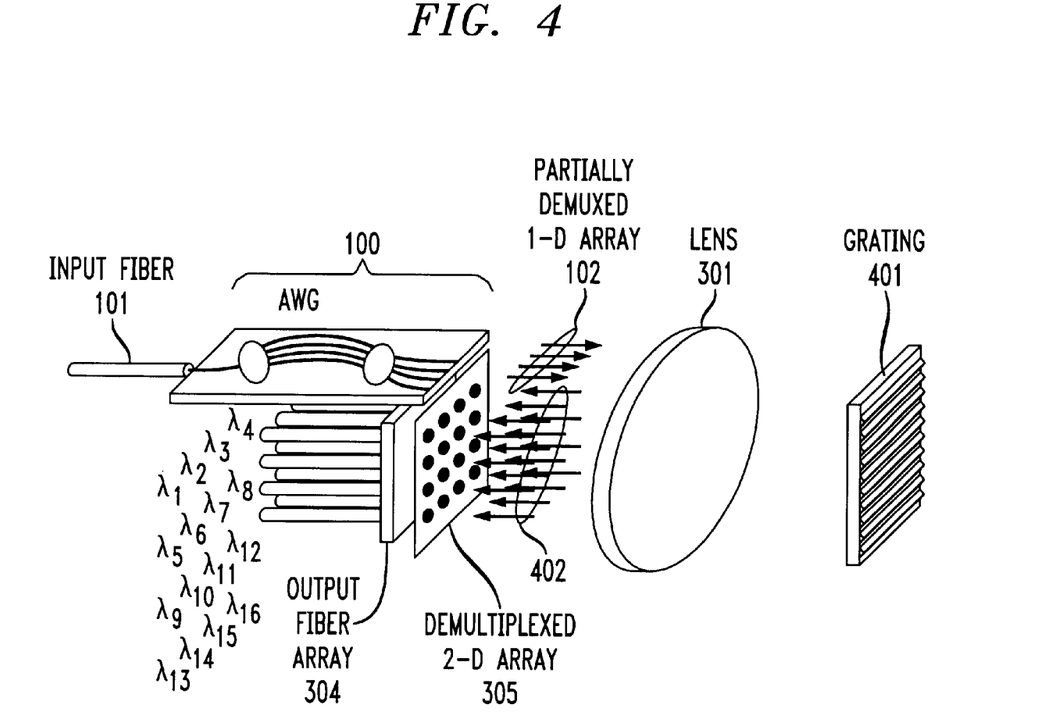
FIG. 4 shows another embodiment of our combination guided wave/free-space wave wavelength router with a two-dimensional output array.

FIG. 4 shows another embodiment of our combination guided wave/ free-space wavelength router using a reflective grating 401 for performing substantially the identical demultiplexing function performed by grating 302 of FIG. 3. This arrangement also enables the lens 301 to be used for both the partially demultiplexed signal array 102 and the demultiplexed signal array 402 reflected from grating 401. In this configuration, a single lens 301 collimates the one-dimensional array of signals 102 and directs them to grating 401 where they are reflected and diffracted. The resulting two-dimensional reflected and diffracted signals are focused by lens 301 to form the demultiplexed signal array 402 which is directed onto the fiber array 304.

Figure 5:
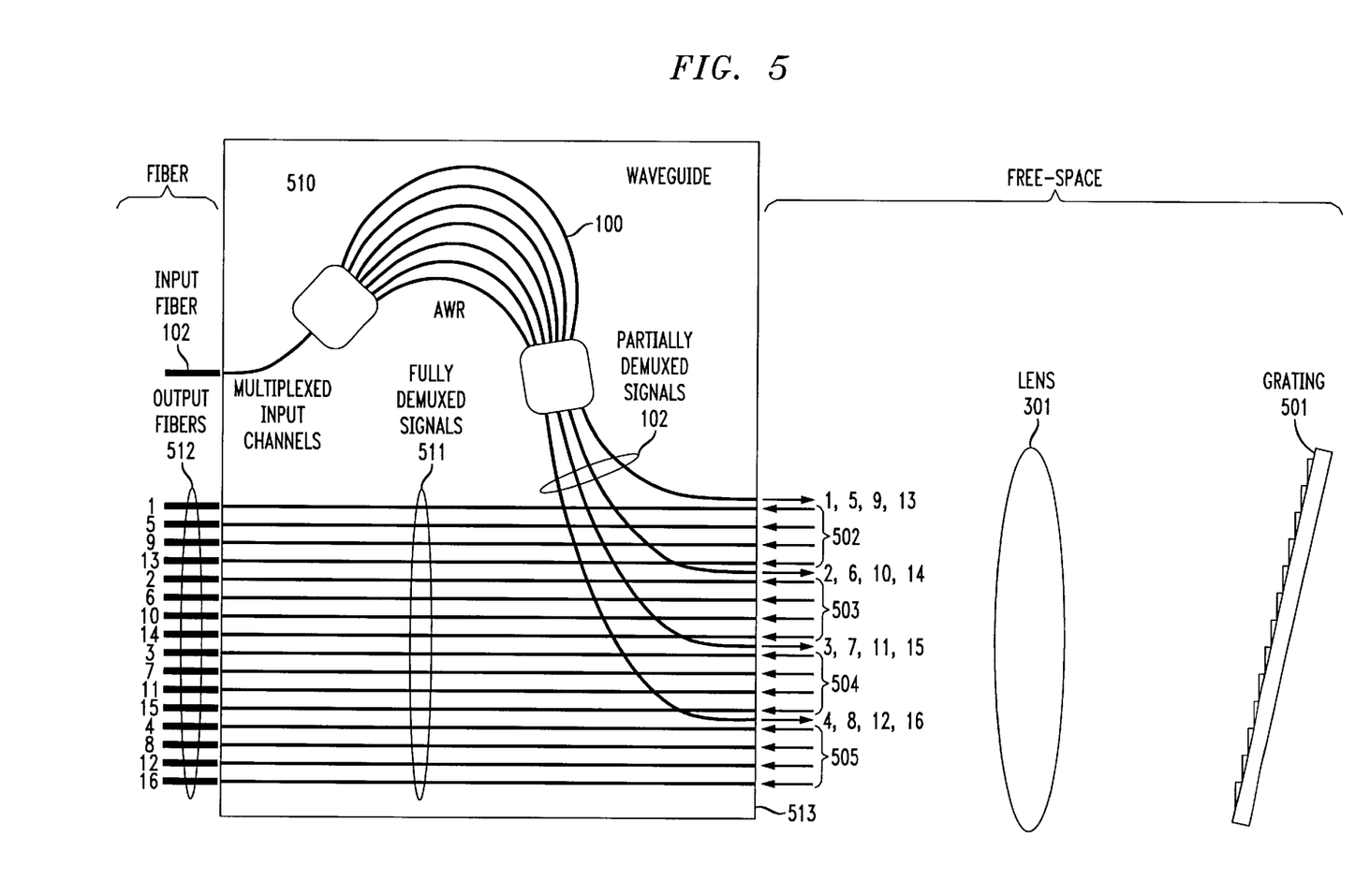
FIG. 5 shows an embodiment of our combination guided wave/free-space wavelength router with a one-dimensional output array.

In another embodiment shown in FIG. 5, the partially demultiplexed multiple wavelength signals 102 are directed into a one-dimensional array by using a grating 501 orientation which is substantially orthogonal to the row of partially demultiplexed waveguide outputs 102. As shown, the partially demultiplexed signal array 102 is collimated by lens 301 and directed to reflective grating 501. The orthogonal orientation of reflective grating 501 cause the wavelengths of each of the partially demultiplexed waveguide outputs 102 to be demultiplexed into a one dimensional array, i.e., 502–505, which is parallel to the partially demultiplexed signal array 102. The parallel alignment of the one dimensional arrays 502–505 enables the waveguide substrate 510 which holds the AWR 100 to also be used as a waveguides 511 for the demultiplexed outputs. This configuration avoids the use of 2-D fiber arrays. The one dimensional output fiber array 512 is connected to the AWR using the same silicon optical bench alignment techniques as used in current AWRs. It should be noted that the waveguide layout shown in the FIG. 5 is illustrative, many considerations such as inter-channel crosstalk, bend and intersection losses will define the waveguide geometry used in a practical layout.

It should also be noted that in a more preferred embodiment, the one-dimensional output fiber array 512 may be coupled directly to one-dimensional spot array, 513, from lens 301, avoiding any additional losses from coupling onto and off of the waveguide substrate 510 for the second time. This is accomplished by simply placing a one-dimensional output fiber array 512 beneath the waveguide substrate 510. In such an arrangement, the horizontal waveguides 511 would not be needed and the output fiber array 512 would be moved just below the partially demultiplexed waveguide outputs 102.

Figure 6:
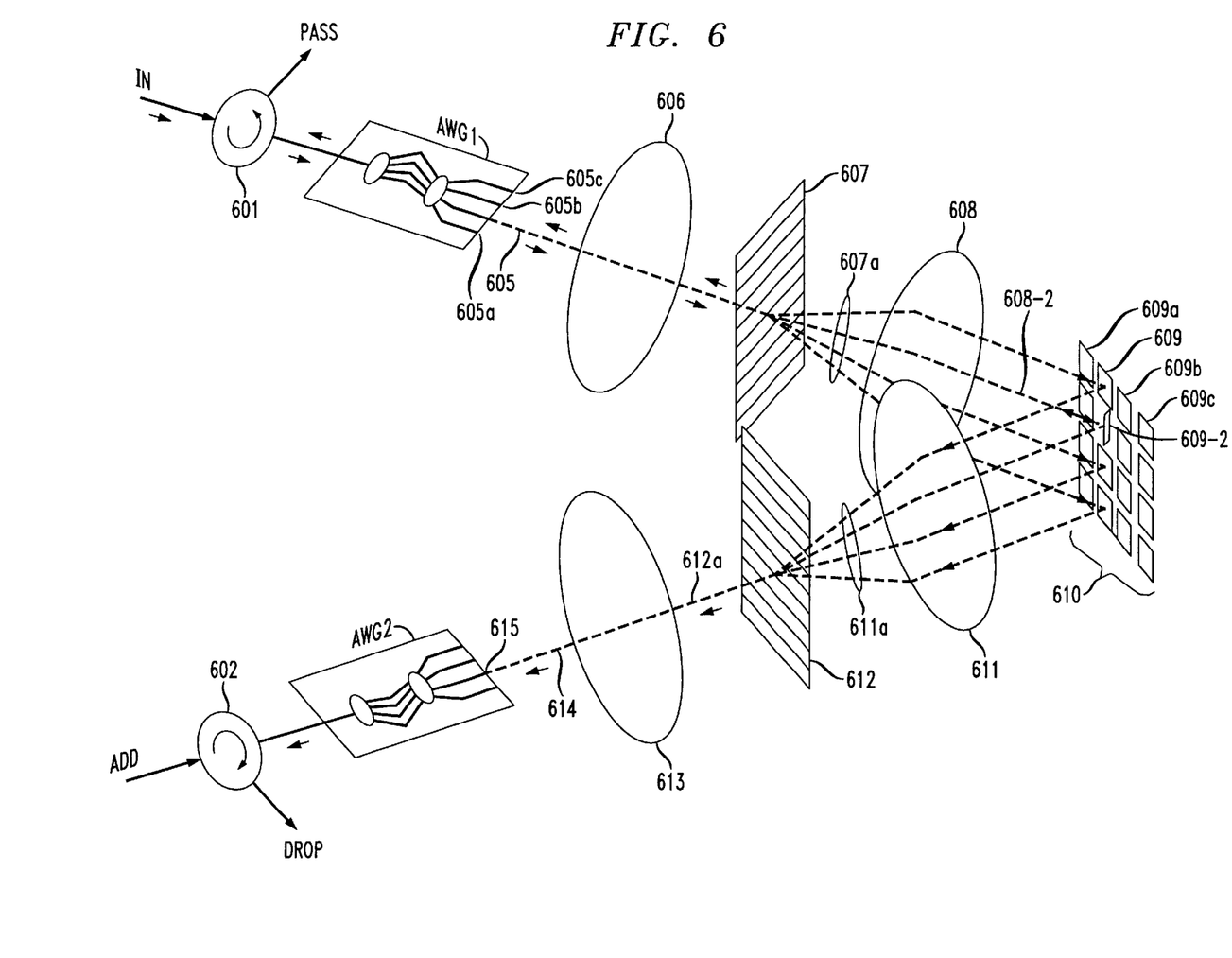
FIG. 6 shows illustratively an optical add/drop multiplexer (OADM) implemented using our combination guided wave/free-space wavelength router and a two-dimensional array of micromechanical tilt mirror switches.

In some applications such as a multiple wavelength add/drop switch, the multi-wavelength signal needs to demultiplexed, each wavelength operated on individually and then remultiplexed. One prior art optical wavelength add/drop switch (OADM) based on spatial optics and using micromechanical tilting mirrors is described in the patent application entitled "Reconfigurable Wavelength Division Multiplex Add/Drop Using Micromirrors," by V. A. Aksyuk et al, filed on Nov. 12, 1997, which is incorporated by reference herein. With reference to FIG. 6, there is shown an illustrative WDM add/drop switch implemented using our combination guided wave/free-space wavelength routers and with a two-dimensional array of micromechanical tilt mirror switches.

As shown in FIG. 6, a circulator 601 couples a received WDM signal at its INPUT port to AWG 1. The AWG 1 and AWG 2, are implemented and operate in the same manner as AWR 100. Note for clarity, FIG. 6 shows the wavelengths from only one of the four partially demultiplexed outputs 605 from AWG 1. The partially demultiplexed outputs 605 from AWG 1 are collimated by lens 606 onto transmissive planar diffraction grating 607 which produces a one-dimensional signal array 607a. The lens 608 focuses the one-dimensional signal array and directs it to the associated column 609 of the two-dimensional (2-D) array of micromechanical tilt mirror switches 610. Each of the other partially demultiplexed outputs 605a–605c from AWG 1, not shown, are also focused by lens 606 onto transmissive planar diffraction grating 607 which produces a one-dimensional signal array 607a for each of the partially demultiplexed outputs 605a–605c from AWG 1. Thus, the grating 607 forms a two-dimensional array of demultiplexed wavelength signals which is focused by lens 608 onto the respective columns 609, 609a–609c of two-dimensional (2-D) array of micromechanical tilt mirror switches 610. The micromechanical tilt mirror switches 610 may be implemented as described in the above-referenced V. A. Aksyuk et al article. Each of the tilt mirror elements are individually controlled to reflect the impinging wavelength back along the same path, e.g., 607a, or tilted to deflect the wavelength to a different path 611a. The tilt mirror elements are individually controlled using electrical signals, not shown.

If we assume that mirror element 609-2 is tilted to a first angle, as controlled by an electrical signal (not shown) applied to that mirror element, the wavelength signal on path 608-2 is reflected back along path 608-2, through lens 608, grating 607, lens 606, over path 605 to AWG 1, outputted to circulator 601 where it exits the PASS port. This describes the path followed by a wavelength which is to be "passed" through the OADM of FIG. 6. However, if mirror element 6092 is not activated, i.e., tilted, the wavelength signal on path 608-2 is reflected to lens 611. Lens 611 focuses 611a all of the signals reflected from inactive mirror elements of mirror array 610 onto the grating 612 which combines the wavelengths and directs the combined signal 612a to lens 613. The lens 613 focuses the signal 614 onto the port 615 of AWG 2. The output of AWG 2, is outputted to circulator 602 where it exits the DROP port. This describes the path followed by any wavelength which is to be "dropped" by the OADM of FIG. 6.

It should be noted that all of the "dropped" wavelengths of the other partially demultiplexed outputs 605a–605c from AWG 1 are reflected from the respective columns 609, 609a–609c of two-dimensional (2-D) array 610 of micromechanical tilt mirror switches and are also focused by lens 611 onto transmissive planar diffraction grating 612 which produces a one-dimensional signal array 612a. The lens 613 then focuses each of these signals onto its associated port of AWG 2 and AWG 2 combines the signals together into a combined signal that is coupled to circulator 602 where it exits at the DROP port.

Any wavelength to be "added" would enter the ADD port of circulator 602, be coupled through AWG 2 to lens 613, grating 612, through lens 611 to the mirror element in array 610 associated with that wavelength. The mirror element associated with the "added" wavelength would have been activated, i.e., tilted, so as to reflect the "added" wavelength back along the "pass" path through lens 608, grating 607, lens 606, AWG 2, circulator 601, and exit the PASS port of circulator 601 along with the "passed" wavelengths from the INPUT port of circulator 601.

As shown in FIG. 6, depending on the specific application, the use of a 2-D mirror element array 610 to process the individual wavelength signals can eliminate the need to couple the light into a 2-D fiber array 304 of FIG. 3. (which may be difficult and/or expensive to accomplish). Moreover, the 2-D mirror device array 610 can be arranged as a lossy reflector and thereby be used to attenuate the intensity of individual wavelength signals similar to the function to the device described in U.S. Pat. No. 5,745,271. Because of planar fabrication techniques, the layout and fabrication of the 2-D arrays of mirror devices 610 is much more easily implemented than connecting to a 2-D array of fibers.

The use of planar fabrication techniques is particularly useful when the input spectrum to an AWR (arrayed waveguide router) exceeds the FSR (free spectral range) and each output from the AWR can carry multiple signals spaced by approximately the FSR. Planar fabrication techniques provides the capability to conform to the exact channel spacing required when the pitch (see 202 of FIG. 2) of the output channels changes slightly for each "wrap" around the output channels.

Figure 7:
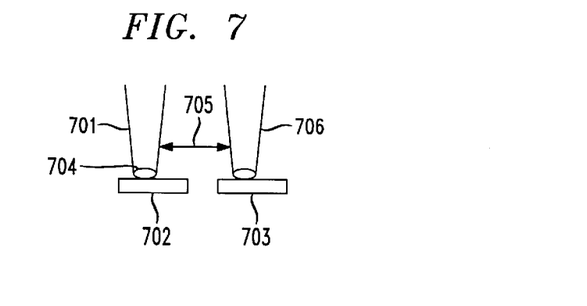
FIG. 7 shows an illustration of an optical signal impinging onto a mirror element.

Advantageously, the WDM add/drop switch (OADM) of FIG. 6 is an improvement over the above- referenced spatial optics based OADM is that it (1) increases the number of channels that can be handled (because of 2-D array of channels) and (2) the component performance on each channel is significantly improved. This second advantage occurs because in the spatial optics based OADM, the column of devices was illuminated by a continuous wavelength signal with zero or near-zero spacing between communications channels. In comparison, in the FIG. 6 OADM, each column of devices is illuminated by discrete signals separated by a "dead space" of at least one full channel width. As shown in FIG. 2, this dead space is the region 201 between the intensity peaks. This dead space between intensity peaks allows a separation of functions. For example, with reference to FIG. 7 there is shown the impinging of the optical signal 701 onto a mirror element 702 of the tilt-mirror switch unit 610. As shown, increasing the dead space 701 between wavelengths 701 and 706 enables the mirror elements 702 and 703 to be made larger, thereby increasing the likelihood that the light intensity peak, i.e., optical spot 704, will fall within the center region of the mirror element 702 and never touch the mirror edge. This is important, because almost all of the undesirable loss, scatter and switching crosstalk occurs from the optical spot 704 scattering off the mirror element 702 edges. The increase in dead space 705 also reduces the packing density and relaxes tolerances of the mirror element 702 tilt circuitry. The increased dead space 705 also reduces alignment tolerance required between spot 704 and the center of the mirror element 702.

Figure 8:
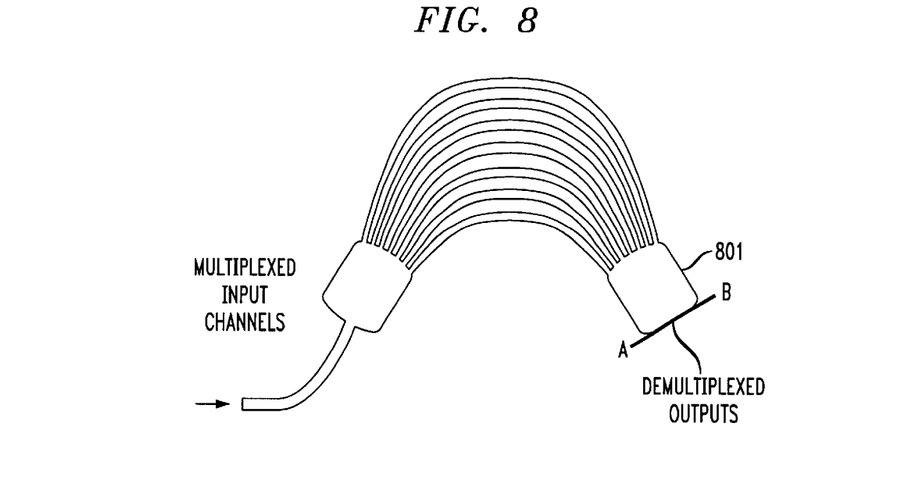
FIG. 8 shows an illustration of a modified AWG.

With reference to FIG. 1, the waveguide output channels 102 define the allowable transmission passbands (where light is transmitted with relatively little loss) on an undesirably nonuniform grid. However, it is possible to exit the waveguide without channelizing the output by terminating the AWG at the line marked AB as shown in FIG. 8. The line AB in FIG. 8, can be formed by simply cleaving, etching, or polishing the edge of free-space region 701 of the AWG.

Figure 9:
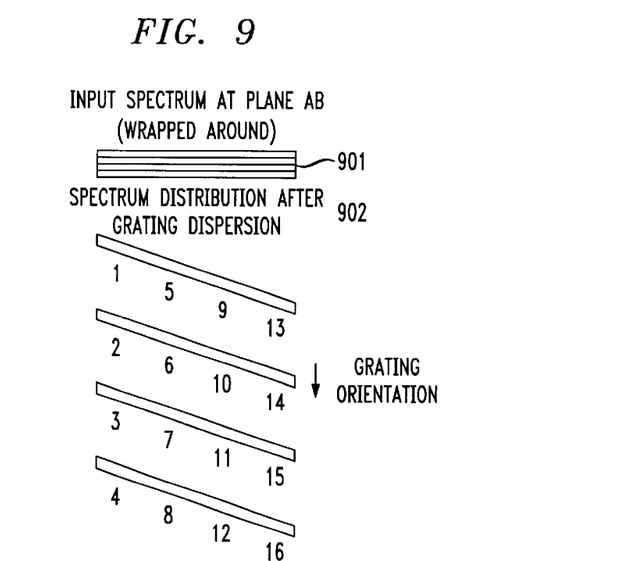
FIG. 9 shows the dispersed output from the modified AWG of FIG. 8.

When the waveguide is terminated at AB, then the output radiates into free space from a continuous broadband light source (with a wavelength range of N times the FSR). The result is a set of N superimposed spectral segments, as shown by 901 of, FIG. 9. With joint reference to FIGS. 6 and 9, when this spectrum is distributed imaging through a planar diffracton grating, e.g., 607 of FIG. 6, the superimposed segments are separated 902 without further channalizing them. The spectral power distribution illuminating the grating 607 will be a set of N continuous spectral segments. The grating orientation shown in FIG. 9 is a more accurate representation of the spectral distribution for an exactly orthogonal grating. In practice, the grating can be rotated a few degrees to line up with the illuminating spots. The mirror elements of unit (or array) 610 are arranged so that each of the individual mirror elements or devices is located at the appropriate spatial location.

In general, it is possible to use the wavelength dispersion properties of the cleaved arrayed waveguide router of FIG. 8 as a substitute for AWG 1 and AWG 2 used in FIG. 6.

In such an arrangement, the partially demultiplexed signal exits truncated router AWG 1, is processed using a free-space optical elements 606, 607 608 (in a manner as previously discussed), reflected by and mirror array 610, is recombined by a second pass through free-space optical elements 606, 607 608, and multiplexed together in the second truncated router AWG 2.

What has been described is merely illustrative of the application of the principles of the present invention. Other methods and arrangements can be implemented by those skilled in the art without departing from the spirit and scope of the present invention.

What is claimed is:

1. An optical apparatus comprising
   an optical arrayed waveguide router (AWR) for receiving at an input wavelength division multiplexed (WDM) signal having M wavelength channels, M>1, and a one dimensional array of N outputs, 1<N<M, for outputting the WDM signal within the free spectral range (FSR) of the AWR, each output n, where $1 \leq n \leq N$, including a partially demultiplexed signal having a plurality of wavelength channels n, n+N, n+2N, ... n+{M/N−1}N of the WDM signal, and
   a free-space optical wavelength channel demultiplexer for receiving each of the partially demultiplexed signal channels and for producing therefrom M wavelength channels, each of the M wavelength channels being outputted at a different one of M outputs.

2. The apparatus of claim 1 wherein the free-space optical wavelength channel demultiplexer includes
   a first lens for collimating the partially demultiplexed signal channels from the one-dimensional array of N outputs onto a grating;
   said grating being a transmissive grating for demultiplexing each of the one-dimensional array of partially demultiplexed signals into individual wavelength channels so as to form a two-dimensional array of wavelength channels;
   a second lens for focusing the two-dimensional array of wavelength channels onto a two-dimensional array of elements.

3. The apparatus of claim 2 wherein the two-dimensional array of elements is a two-dimensional array of mirror elements, one or more mirror elements being individually controlled to reflect one of the two-dimensional array of wavelength channels back through the second lens, the transmissive grating, the first lens to said AWR when a first control signal is applied to said one or more mirror elements.

4. The apparatus of claim 3 wherein when a second control signal is applied to a mirror element that mirror element reflects its wavelength channels back through
   a third lens for focusing the reflected wavelength channel onto a second grating;
   said second grating being a transmissive grating for multiplexing together into a combined signal each reflected wavelength channel which originated from the same partially demultiplexed signal;
   a fourth lens for focusing the combined signal onto a second AWR.

5. The apparatus of claim 4 further including
   a first circulator for coupling signals to and from the AWR and
   a second circulator for coupling signals to and from the second AWR.

6. The apparatus of claim 5 wherein the AWR and the second AWR each include
   an input waveguide for receiving the WDM signal, a first free space region connected to both the input waveguide and to a first end of a set of chirped waveguides, a second free space region connected to both a second end of the chirped waveguides and to a set of N output waveguides which terminate in a one-dimensional array of N outputs.

7. The apparatus of claim 5 where the one-dimensional array of elements includes a one-dimensional array of optical fibers.

8. The apparatus of claim 5 where the one-dimensional array of elements is a one-dimensional waveguide array formed together with the AWR on a waveguide unit.

9. The apparatus of claim 3 further including
   a first circulator for coupling signals to and from the AWR.

10. The apparatus of claim 1 wherein the free-space optical wavelength channel demultiplexer includes
    a first lens for focusing the partially demultiplexed signal channels from the one-dimensional array of N outputs onto a grating;
    said grating being a reflective grating for demultiplexing each of the one-dimensional array of partially demultiplexed signals into individual wavelength channels so as to form a one-dimensional array of wavelength channels;
    said lens focusing the one-dimensional array of wavelength channels onto a one-dimensional array of elements.

11. The apparatus of claim 1 wherein the M outputs are arranged in a one-dimensional array.

12. The apparatus of claim 1 wherein the M outputs are arranged in a two-dimensional array.

13. An optical apparatus comprising
    a planar optical arrayed waveguide router (AWR) for receiving an input wavelength division multiplexed (WDM) signal having M wavelength channels, M>1, and an output,
    a lens for collimating a signal from the AWR output onto a free-space optical wavelength channel demultiplexer, and
    the free-space optical wavelength channel demultiplexer being oriented in a different plane than the AWR, for receiving the collimated output from the lens and for producing therefrom M wavelength channels, each of the M wavelength channels being outputted at a different one of M outputs.

14. The optical apparatus of claim 13 wherein the AWR includes
    an input waveguide for receiving the WDM signal,
    a first free space region connected to both the input waveguide and to a first end of a set of chirped waveguides,
    a first side of a second free space region connected to a second end of the chirped waveguides, and
    a second side of the second free space region being formed having a straight line edge to serve as the output of the AWR.

* * * * *